United States Patent
Zansky et al.

(10) Patent No.: US 7,639,520 B1
(45) Date of Patent: Dec. 29, 2009

(54) EFFICIENT POWER SUPPLY

(75) Inventors: Zoltan Zansky, Sunnyvale, CA (US);
Bill Jacobsen, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 339 days.

(21) Appl. No.: 11/710,861

(22) Filed: Feb. 26, 2007

(51) Int. Cl.
*H02M 7/00* (2006.01)

(52) U.S. Cl. ............................. 363/65; 363/67; 363/71

(58) Field of Classification Search .................. 363/34, 363/37, 65, 67, 71, 78, 84, 89, 125, 131
See application file for complete search history.

(56) References Cited

U.S. PATENT DOCUMENTS

| | | | | |
|---|---|---|---|---|
| 5,311,419 A | * | 5/1994 | Shires | 363/65 |
| 5,777,864 A | * | 7/1998 | Seong et al. | 363/98 |
| 5,894,412 A | * | 4/1999 | Faulk | 363/17 |
| 6,259,613 B1 | * | 7/2001 | Lee et al. | 363/89 |
| 6,275,397 B1 | * | 8/2001 | McClain | 363/89 |
| 6,307,761 B1 | * | 10/2001 | Nakagawa | 363/65 |
| 2007/0139984 A1 | * | 6/2007 | Lo | 363/89 |

* cited by examiner

*Primary Examiner*—Adolf Berhane
(74) *Attorney, Agent, or Firm*—Suiter Swantz pc llo

(57) ABSTRACT

The present invention is a method and system for efficiently converting an alternating current (AC) supply to a direct current (DC) output. A power supply in accordance with the present invention may employ variable frequency constant on-time converters whereby switching losses of the converters are approximately proportional with a switching frequency, causing the power supply to be more efficient at light loads. Additionally, a power supply in accordance with the present invention may include multiple-phase converters in which each phase is designed for operation at a fraction of the total maximum load for the power supply.

19 Claims, 6 Drawing Sheets

EFFICIENT POWER SUPPLY

FIELD OF THE INVENTION

The present invention generally relates to the field of power supplies, and more particularly to an efficient power supply across a wide load.

BACKGROUND OF THE INVENTION

Power supplies are employed with electrical equipment to provide a stable output voltage. Electrical power equipment typically requires a direct current voltage supply. However, electricity is typically supplied through an alternating current (AC) distribution. A power supply may be an alternating current-direct current (AC/DC) power supply. A power supply may be utilized to convert an AC source, such as from power mains to a DC output which may be utilized to power components of an apparatus or system. For example, an AC/DC power supply may receive a 110 volt alternating current (VAC), 60 Hertz supply from mains, such as from a wall plug or power outlet. An AC/DC power supply may convert the AC supply to a DC output, such as a 5 volt or 12 volt DC output. The components of an electrical device may be powered through connection to the DC output, directly from the power supply or through a power bus.

In order to reduce the power consumption of a power supply, the power supply may be designed to operate at a high efficiency. Power supply efficiency may refer to the DC output of a power supply divided by the AC input. When the power supplies draws more AC power to produce the same DC output, the efficiency is reduced. The reduced efficiency of a power supply causes an increase in power consumption to handle the load.

When a narrow load range is required for a power supply, the power supply may be designed to operate efficiently. However, many applications of electrical equipment require a wide load range. A problem associated with conventional power supplies is the reduced efficiency of the power supply at light loads. For example, efficiency may be 75-90% at 50-100% of the maximum specified load of the power supply. However, efficiency at loads less than 50% of the maximum supplied load is poor.

Redundant power supplies for network storage systems typically operate at 30-35% of the maximum supplied load. With an increase in energy costs, the cost associated with supplying power for redundant power supplies has become significant. Consequently, a method and system for increasing the efficiency of power supplies is necessary.

SUMMARY OF THE INVENTION

Accordingly, the present invention is directed to a method and apparatus for increasing the efficiency of a power supply. In one embodiment of the invention, a power supply of the present invention may include a variable frequency converter and may convert an alternating current (AC) input into a direct current (DC) output. A power supply in accordance with the present invention may include a variable frequency converter for power factor correction and may include a variable frequency DC/DC converter. In one embodiment of the invention, a variable frequency converter may be a constant on-time variable frequency converter. With the use of a variable frequency converter, switching losses of a converter may be approximately proportional to switching frequency. As a result, the power supply of the present invention may be more efficient at light loads.

In an alternative embodiment of the invention, a power supply may include multiple-phase parallel converters. Each phase of the multiple-phase parallel converters may be designed for maximum efficiency at a fraction of a maximum load of the power supply. In one embodiment of the invention, multiple-phase parallel converters may include two converters for power factor correction and two converters for DC/DC converters whereby each phase is designed for operate for 0 to 50% of the maximum required load. A converter controller of the power supply may determine the load supplied by the power supply to control one or more phases of the multiple-phase converter. In a two phase implementation, a 50 to 100% load may be supported when both phases of the power supply are operating. Through adjustment of the design of the power supply into a narrower load for each phase of a multiple-phase power supply, each phase of the power supply may be operable at a higher efficiency whereby the overall efficiency of the power supply may be improved.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring to FIGS. 1-6, embodiments of a method and system for efficiently converting an alternating current (AC) supply to a direct current (DC) output are described. A power supply in accordance with the present invention may employ a variable frequency converter whereby switching losses of the converter may be approximately proportional to switching frequency, causing the power supply to be more efficient at light loads. Additionally, a power supply in accordance with the present invention may include multiple-phase converters in which each phase is designed for operation at a fraction of the total maximum load for the power supply to increase efficiency of the power supply.

Figure 1:
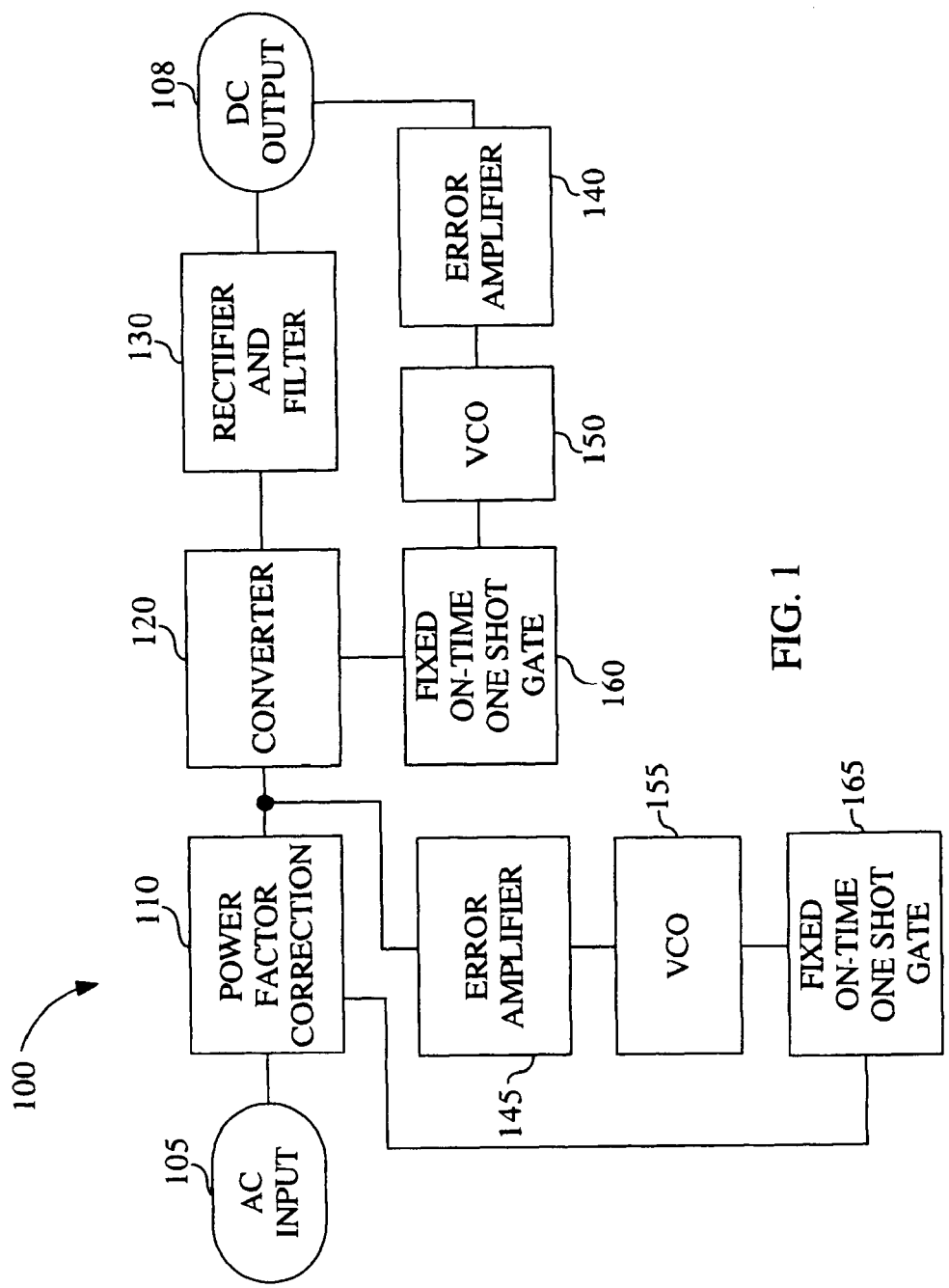
FIG. 1 depicts a block diagram of a power supply implementing a variable frequency scheme in accordance with the present invention.

Referring to FIG. 1, a block diagram of a power supply 100 implementing a variable frequency scheme in accordance with the present invention is shown. Power supply 100 may include an input 105 for receiving an alternating current (AC) supply. An AC supply may be a 110-120 Volt, 60 Hertz supply. However, other types of AC supplies may be utilized by power supplies of the present invention without departing from the scope and intent of the present invention. Power supply 100 may convert the AC supply to a direct current (DC) output 108, such as 5 to 12 volts. Power supply 100 may include power factor correction 110, a converter 120, and a rectifier/filter 130.

Power factor correction 110 may receive the AC supply from input 105 and may produce a DC voltage. Power factor correction may be employed to control harmonic current. Additionally, power factor correction 110 may maintain a constant DC voltage while drawing a current which is in phase and in frequency with the AC voltage. Power factor correction 110 may include a boost converter. A boost converter may maintain a constant DC output voltage while drawing a current which may be in phase with and at the same frequency as the input. Boost converter of power factor correction may operate whereby the switching frequency of the converter is dependent upon the load current. Consequently, at light loads, the switching frequency of the boost converter is reduced which reduces switching losses. The reduction in switching losses at light loads improves the overall efficiency of the power supply 100.

Converter 120 may be a DC/DC converter. In an embodiment of the invention, converter 120 may receive a high DC voltage and produce a reduced DC output voltage. DC/DC converter may be a flyback, forward, half or full bridge converter with transformer isolation. DC/DC converter may also operate according to a variable frequency scheme whereby the switching frequency of the converter 120 is dependent upon the current load supplied by the power supply.

Rectifier/filter 130 may receive the DC output voltage from converter 120. Rectifier/filter 130 may remove AC variations from the DC output voltage supplied by the converter 120 to provide a constant and stable DC supply suitable for use with electrical components of a computing system. While power supply 100 includes power factor correction 110 and rectifier/filter 130, it is contemplated that power supply may include an input 105 and converter 120 which operates according to a variable frequency scheme without departing from the scope and intent of the present invention.

Conventional power supplies known to the art include power factor correction and converters which operate on a fixed frequency. Fixed-frequency converters include substantial fixed losses which are independent of a load current. As a result, switching losses at light load currents are the same as switching losses at high load currents. The power supply of the present invention may include at least one or more converters which operate with fixed on-times, but at a variable switching frequency which may be approximately proportional to a load current which reduces switching losses at light loads and improves the overall efficiency of the power supply.

A converter 120 which operates in accordance with a variable frequency scheme may be a constant on-time variable frequency converter. In a constant on-time variable frequency converter, a transistor of the converter may have an on-time which may be fixed and the energy transferred to a load during a switching period is fixed. Output voltage is regulated by a variation of the switching frequency and efficiency of the converter may be independent of load current. Additionally, a converter 120 which operates in accordance with a variable frequency scheme may be a constant peak current converter. A constant peak current converter may monitor transistor current of the transistor of a converter and may switch the transistor off when the transistor current reaches a predetermined level. Output voltage is similarly regulated by the switching frequency and efficiency of the converter may be independent of load current.

It is contemplated that a variable frequency scheme may be implemented with an error amplifier 140, 145, a voltage controller oscillator (VCO) 150, 155 and a fixed on-time one shot gate 160, 165. An error amplifier 140, 145 may refer an operational amplifier (op-amp) with a voltage reference and feedback. Error amplifier 140 may receive a feedback from the output of the power supply 100. Error amplifier 145 may receive feedback from the output of power factor correction 110. An input control voltage of the VCO 150, 155 may be coupled to the output of an error amplifier 140, 145, similar to a standard pulse width modulation (PWM) control scheme. The output of the error amplifier 140 may be indicative of the output load supplied by the power supply. For example, an increasing error amplifier 140 output voltage may increase the frequency of the VCO 150, which would adjust the switching frequency of a converter 120. Similarly, an increasing error amplifier 145 output voltage may increase the frequency of VCO 155, which would increase the frequency of a converter of power factor correction 110. An VCO 150, 155 may include a voltage inverting operational amplifier. The output of the VCO 150, 155 may be coupled to a fixed on-time one shot gate 160, 165. The fixed on-time one shot gate 160, 165 may drive power transistors, such as power field effect transistors, of converters of power factor correction 110 and converter 120. Advantageously, power factor correction 110 and converter 120 may be operable according to a variable frequency scheme.

Figure 2:
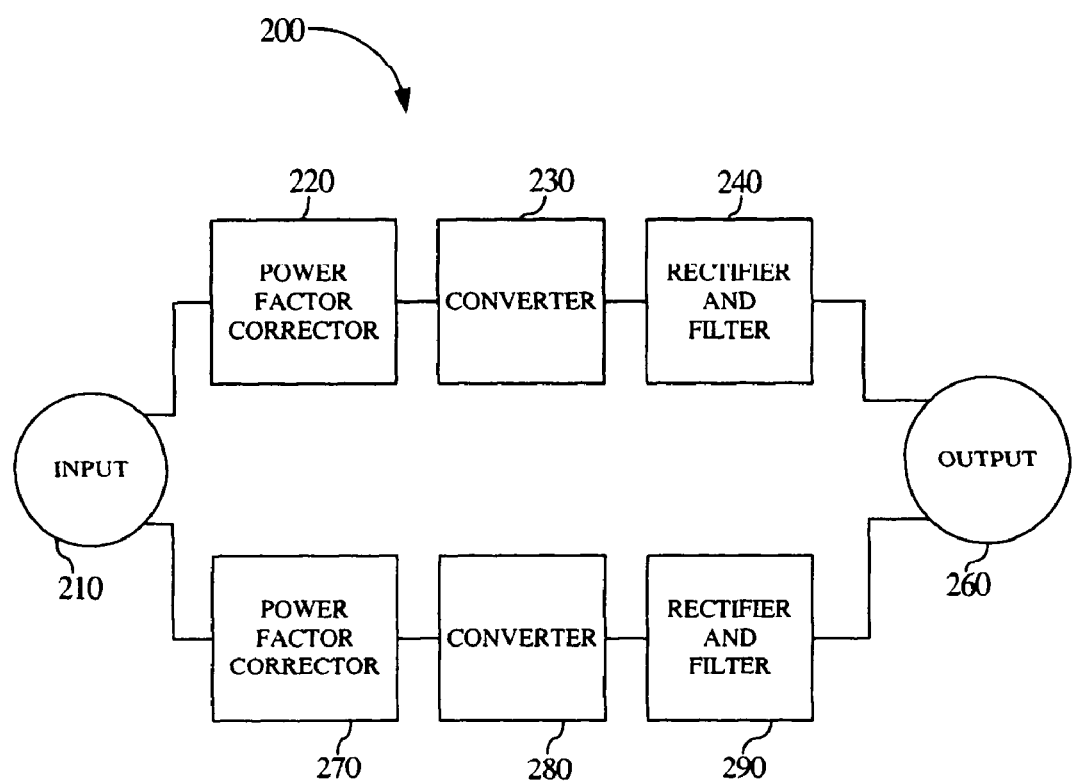
FIG. 2 depicts a block diagram of a power supply implementing a two phase scheme in accordance with an embodiment of the present invention.

Referring to FIG. 2, a block diagram of a power supply 200 implementing a two phase scheme in accordance with an embodiment of the present invention is shown. Power supply 200 may include an AC input 210 for receiving an AC supply and may provide a DC output 260. Power supply 200 may include two parallel phases. A first phase may include a power factor corrector 220, converter 230 and rectifier and filter 240. A second phase may include a power factor corrector, 270, converter 280 and rectifier and filter 290. Each phase of the multiple-phase parallel converters may be designed for maximum efficiency at a fraction of a total load. In an embodiment of the invention, a first phase of the power supply 200 may be designed for 0 to 50% of the maximum load and a second phase may be designed for 0 to 50% of the maximum load. It is contemplated that each phase may be designed for maximum efficiency at half of each phase's maximum load, such as 25% of the total maximum load.

It is further contemplated that 0 to 50% maximum load may be provided by first phase which includes power factor corrector 220, converter 230 and rectifier and filter 240. When power supply 200 is required to supply a load greater than 50% of the maximum load, then first phase and second phase of power supply 200 may be operating in parallel to provide the desired load. Advantageously, the overall efficiency of power supply 200 may be improved by narrowing the load of each phase and allowing each phase to operate at the load percentage which provides the greatest efficiency.

Figure 3:
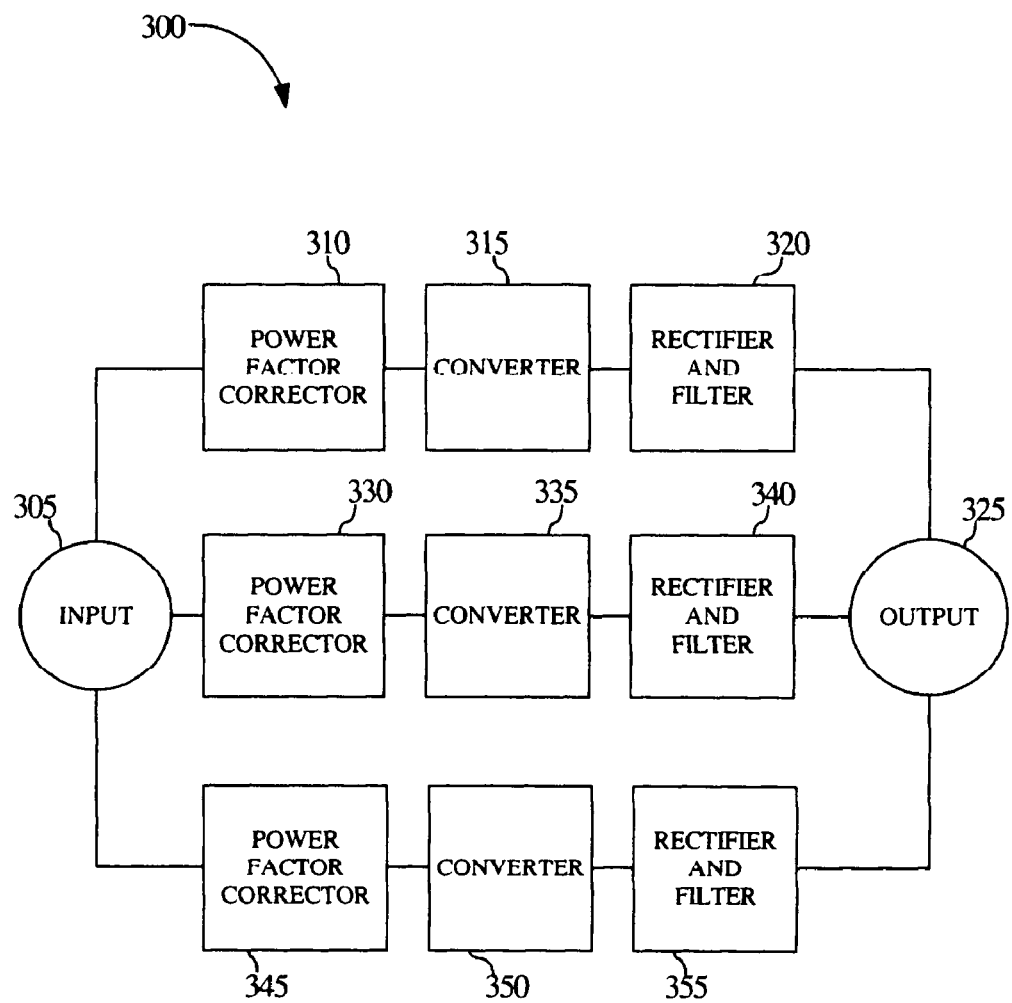
FIG. 3 depicts a block diagram of a power supply implementing a three phase scheme in accordance with an embodiment of the present invention.

Referring to FIG. 3, a block diagram of a power supply 300 implementing a three phase scheme in accordance with an embodiment of the present invention is shown. Power supply 300 may be substantially similar to power supply 200 of FIG. 2 but may implement a three phase scheme. Power supply 300 may include an AC input 305 for receiving an AC supply and may provide a DC output 325. Power supply 300 may include three parallel phases. A first phase may include a power factor corrector 310, converter 315 and rectifier and filter 320. A second phase may include a power factor corrector 330, converter 335 and rectifier and filter 340. A third phase may include a power factor corrector 345, converter 350 and rectifier and filter 355.

Each phase of the power supply 300 may be designed for maximum efficiency at a fraction of a total load. In an embodiment of the invention, a first phase of the power supply may be designed for 0 to 33.33% of the maximum load. It is contemplated that each phase may be designed for maximum efficiency at half of each phase's maximum load, such as 17% of the total maximum load. It is further contemplated that a first phase may be operable with a load of 0 to 33.33% of the maximum load. First phase and second phase may be operable with a load of 33.34 to 66.66% of the maximum load. First phase, second phase and third phase may be operable with a load of 66.67 to 100% of the maximum load. Power supply 300 may include a current sensor (not shown) to determine the current load and control operation of one or more phases of the power supply 300. Through adjustment of the design of the power supply into a narrower load range for each phase of a multiple-phase power supply, each phase of the power supply may be operable at a higher efficiency whereby the overall efficiency of the power supply may be improved. While two phase and three phase power supplies have been described, it is contemplated that four and more phase power supplies may be implemented without departing from the scope and intent of the present invention. Additionally, power supplies 200, 300 of FIGS. 2-3 depict two stage power supplies with a power factor corrector stage and a converter stage. It is contemplated that a single stage power factor and multiple stage converters or multiple phase power factor and single stage converter design and other designs for power supplies may be employed with a multiple-phase scheme without departing from the scope and intent of the present invention.

Figure 4:
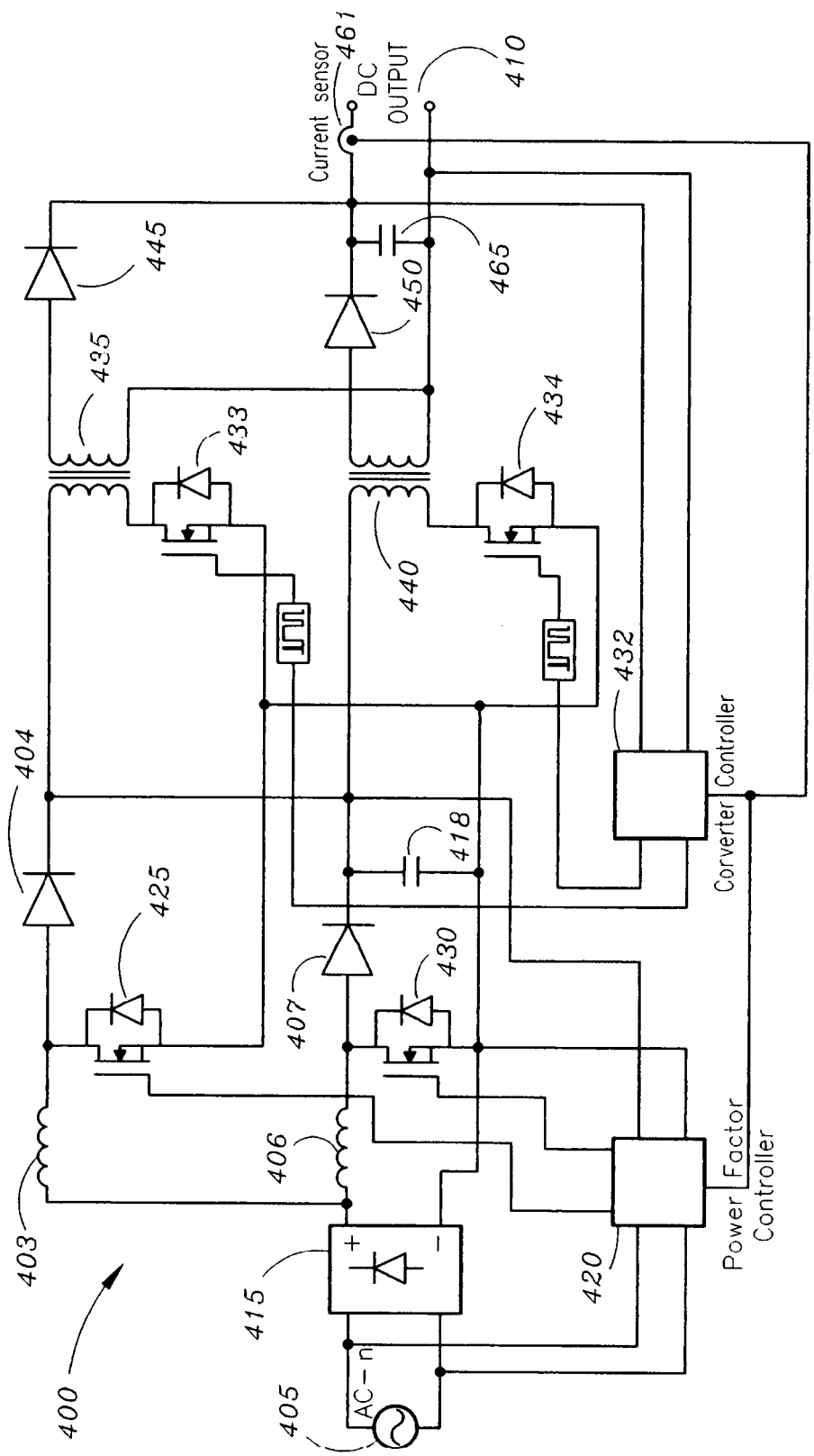
FIG. 4 depicts a circuit diagram of a power supply implementing a two phase scheme in accordance with an embodiment of the present invention.

Referring to FIG. 4, a circuit diagram of a power supply 400 implementing a two phase scheme in accordance with an embodiment of the present invention is shown. Power supply 400 may be one implementation of power supply 200 of FIG. 2. A first phase of the power supply 400 may include inductor 403, diode 404, transistors 425, 433, transformer 435 and diode 445 which form a first power factor converter and a first output converter stage. A second phase of the power supply 400 may include an inductor 406, diode 407, transistors 430, 434, transformer 440 and diode 450 which form a second power factor converter and second output converter stage. Power supply 400 may include an AC input 405 for receiving an AC supply and may provide a DC output 410. The AC input 405 may be coupled to a rectifier bridge 415 which may convert the AC voltage to a DC voltage. Power factor controller 420 may operate with a first power factor converter comprising inductor 403, diode 404 and transistor 425 and may operate with a second power factor converter comprising inductor 406, diode 407 and transistor 430 to adjust the power factor. Adjustment of the power factor may reduce harmonics and increase efficiency of the power supply 400.

Power factor controller 420 and converter controller 432 may be coupled with current sensor 461 which provides a value of the output current and output voltage which may be utilized to enable the second phase of the power supply 400 if the load current is greater than 50% of the maximum specified load of the power supply 400. Converter controller 432, transistors 433, 434 and transformers 435, 440 may form output stages of the power supply 400. The output stages may be flyback converters in which a first phase output stage may include a transistor 433 and transformer 435 and a second phase output stage may include a transistor 434 and transformer 440. The flyback converters may convert the DC voltage on capacitor 418 to a desired output voltage at the DC output 410. Diodes 445, 450 may operate with output capacitor 465 to rectify and filter the outputs of the flyback converters and filter the DC output voltage.

Power factor controller 420 and converter controller 432 may be coupled with current sensor 461 which provides a value of the output current which may be utilized to properly control one or more phases of the power supply 400. For example, first phase output converter stage with transistors 425, 433 and transformer 435 may be part of the first phase of power supply 400. Second output converter stage with transistors 430, 434 and transformer 440 may be part of a second phase of power supply 400. It is contemplated that a first phase of the power supply may be designed for 0 to 50% of the maximum load and a second phase may be designed for 0 to 50% of the maximum load. Each phase may be designed for maximum efficiency at half of each phase's maximum load, such as 25% of the total maximum load. A 0 to 50% maximum load may be provided by first phase. When power supply 400 is required to supply a load greater than 50% of the maximum load, then first phase and second phase of power supply 400 may be operating in parallel (simultaneously) to supply the desired load. In one embodiment of the invention, power supply output stages may include flyback converters. In alternative embodiments of the invention, these output stages may be a forward converter, half or full bridge converter and other types of DC/DC converters.

It is contemplated that power supply 400 of FIG. 4 may improve efficiency and may provide additional improvements in accordance with the present invention. For example, phase shifting may be employed between phases. For example, if a half period phase shifting is employed between switching transistor 434 on and transistor 433 on, the effective output current frequency through sensor 461 may be doubled. This may reduce the capacitance requirement of the output capacitor 465 which reduces component costs. Additionally, while power supply 400 employs two phases with each phase including a power factor converter and an output stage, it is contemplated that power supply 400 may be operate according to a two phase scheme with a single power factor converter with two phase output stages or a single phase output stage with two phase power factor stages in alternative embodiments of the present invention.

Figure 5:
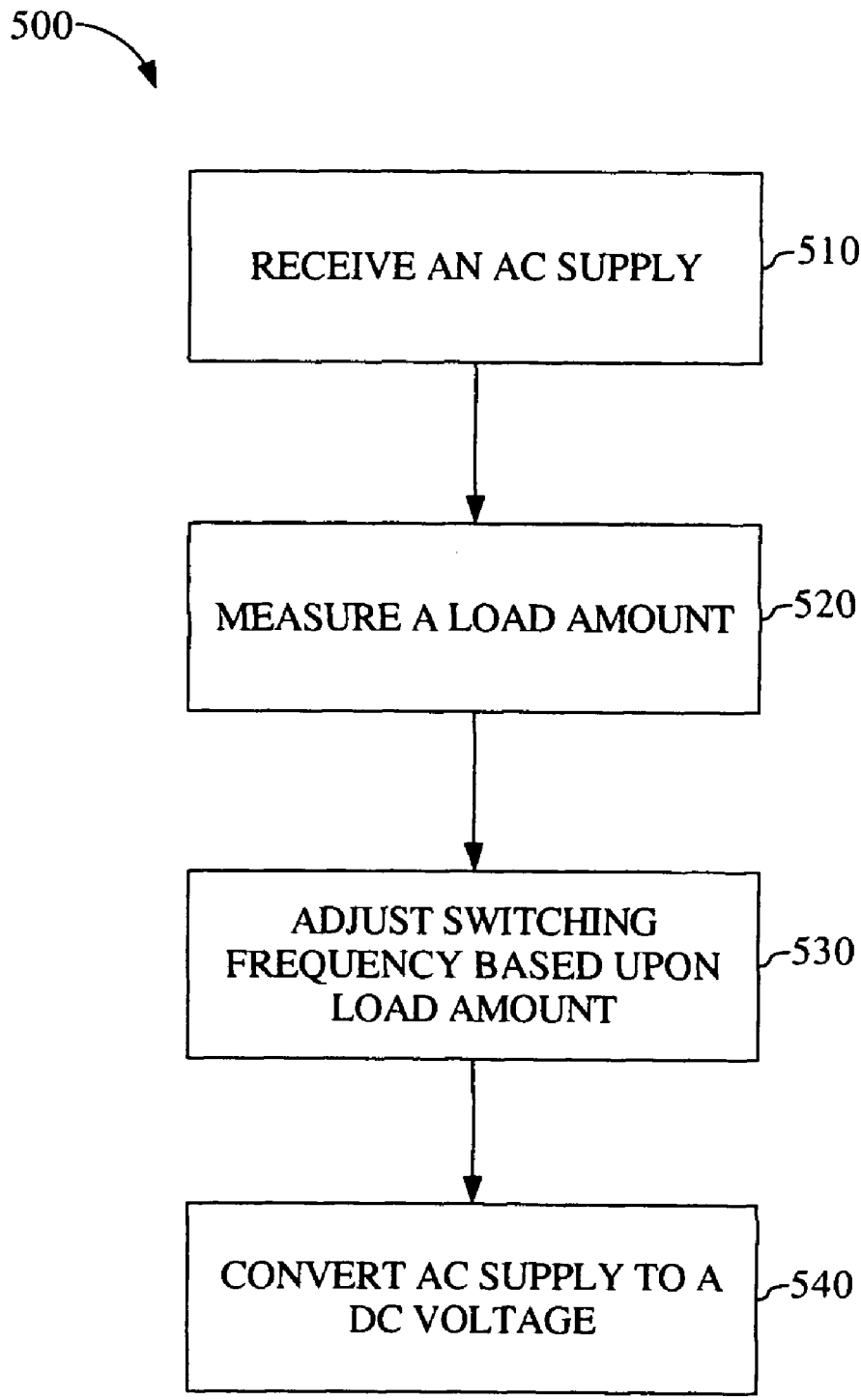
FIG. 5 is a flow chart depicting a method of converting an AC input to a DC output in accordance with an embodiment of the present invention.

Referring to FIG. 5, a flow chart depicting a method 500 of converting an AC supply to a DC output in accordance with an embodiment of the present invention is shown. It is contemplated that method 500 may be executed by power supply 100 of FIG. 1. Method 500 may begin by receiving an AC supply 510. Method 500 may further include measuring a load amount being drawn 520. For example, measuring a load amount may include measuring output current supplied by the power supply executing method 500 of the present invention. Upon determining the current load, the switching frequency of converters may be approximately proportionally adjusted 530. For example, if the current load is 10% of a maximum load of a power supply, then the switching frequency may be adjusted to 10% of the maximum switching frequency. Next, method 500 may include converting the AC supply to a DC voltage 540. Advantageously, through adjustment of the switching frequency according to the current load, switching losses may be reduced and an efficiency of a power supply may be improved.

Figure 6:
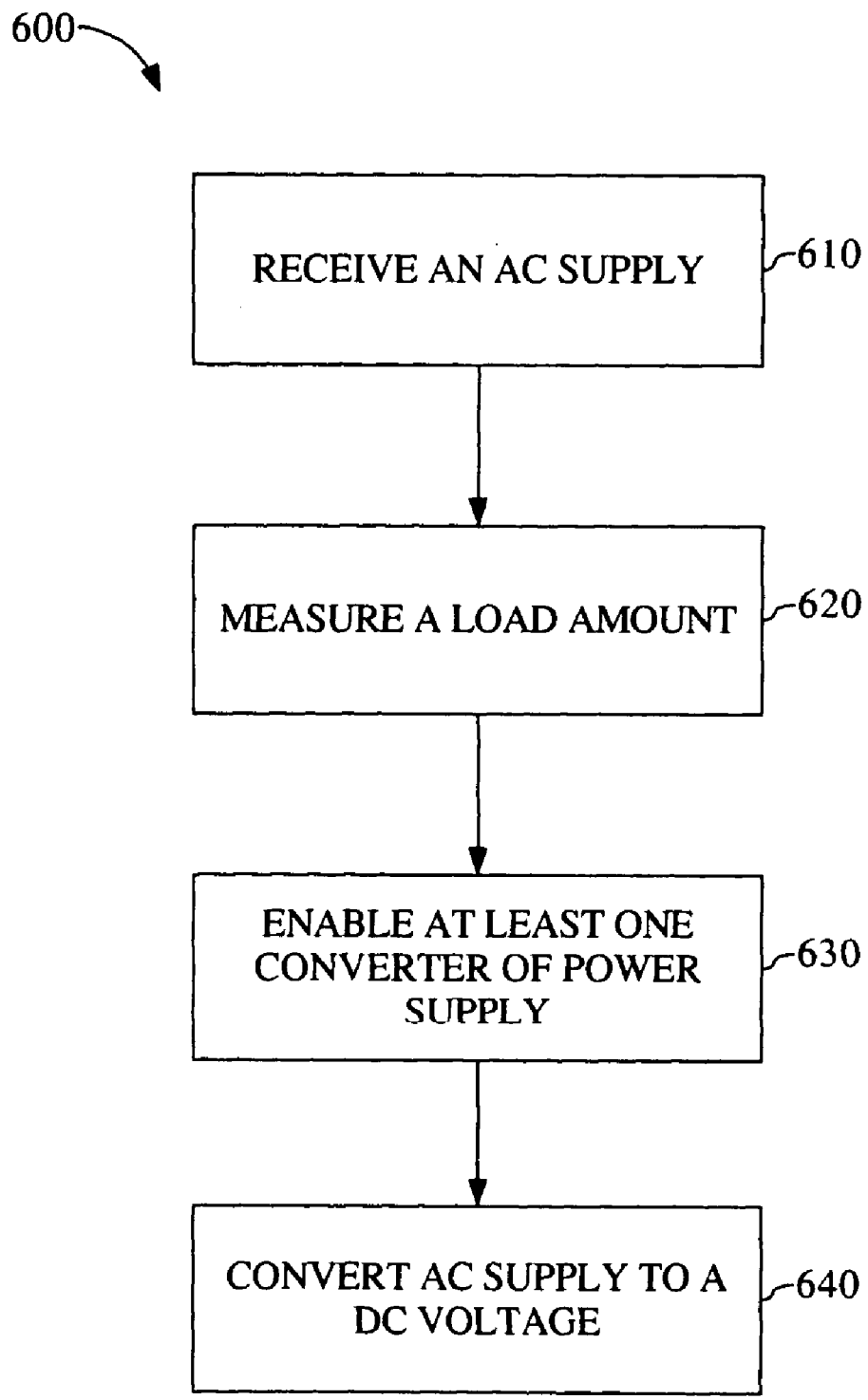
FIG. 6 is a flow chart depicting a method of converting an AC input to a DC output in accordance with an alternative embodiment of the present invention.

Referring to FIG. 6, a flow chart depicting a method of converting an AC supply to a DC output in accordance with an alternative embodiment of the present invention is shown. It is contemplated that method 600 may be executed by power supply 200, 300, 400 of FIGS. 2-4. Method 600 may begin by receiving an AC input 610. Method 600 may further include measuring a load amount load being drawn 620. For example, measuring a load amount may include measuring output current supplied by the power supply executing method 600 of the present invention. Upon determining the current load is less than ½ of the maximum load, enabling at least one phase of a power supply 630. For example, a power supply may include multiple phases whereby a first phase of the power supply may be designed for 0 to 50% of the maximum load and a second phase may be designed for 0 to 50% of the maximum load. Next, method 600 may include converting the AC supply to a DC voltage 640.

In another embodiment of the present invention, it is contemplated that power supplies 200, 300 and 400 of FIGS. 2-4 may include converters which implement a variable frequency scheme as described within power supply 100 of FIG. 1. For example, converters 230 and 280 of FIG. 2 may be variable frequency converters to provide increased efficiency.

It is contemplated that the method and system for efficiently converting an alternating current (AC) supply to a direct current (DC) output may be implemented with storage systems. For example, redundant power supplies utilized for storage systems typically operate at 20-40% of the maximum supplied load of the power supply. High reliability computer systems may include two power supplies which may operate at 30-35% of the maximum load. During downtime of one power supply, the other power supply may operate at 60-70% of its maximum load. It is contemplated that one of two phases of power supply 400 may operate to provide 30-35% of the maximum load and may increase the efficiency over conventional power supplies.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The invention claimed is:

1. A power supply, comprising:
   an input for receiving an alternating current (AC) supply;
   a first converter, said first converter being coupled to said input, said first converter being suitable for converting the AC supply to a direct current (DC) voltage output;
   a second converter, said second converter being coupled to said input, said second converter being suitable for converting said AC supply to a direct current (DC) voltage output; and
   a converter controller that responds to a load supplied by the power supply and enables at least one of a first converter and second converter based upon an amount of load supplied by the power supply, wherein only said first converter out of said first converter and said second converter is operating when said amount of load is less than a particular load percentage of a maximum load supplied by the power supply, said first converter and said second converter have a switching frequency of a percentage of a maximum switching frequency which corresponds to a load percentage of the maximum load supplied by the power supply.

2. The power supply as claimed in claim 1, wherein said first converter and second converter are operating when said load is greater than the particular load percentage of the maximum load supplied by the power supply.

3. The power supply as claimed in claim 1, further comprising a power factor corrector.

4. The power supply as claimed in claim 3, wherein said power factor corrector includes a boost converter.

5. The power supply as claimed in claim 4, wherein
   said boost converter has a switching frequency of a percentage of a maximum switching frequency which corresponds to a load percentage of the maximum load supplied by the power supply.

6. The power supply as claimed in claim 1, wherein said first converter is configured for 0 to 50% of the maximum load.

7. The power supply as claimed in claim 6, wherein said first converter is configured for maximum efficiency at 25% of the maximum load.

8. The power supply as claimed in claim 1, wherein said second converter is configured for 0 to 50% of the maximum load.

9. The power supply as claimed in claim 8, wherein said second converter is configured for maximum efficiency at 25% of the maximum load.

10. A power supply, comprising:
    an input for receiving an alternating current (AC) supply;
    a first converter, said first converter being coupled to said input, said first converter being suitable for converting the AC supply to a direct current (DC) voltage output;
    a second converter, said second converter being coupled to said input, said second converter being suitable for converting said AC supply to a direct current (DC) voltage output;
    a third converter, said third converter being coupled to said input, said third converter being suitable for converting said AC supply to a direct current (DC) voltage output; and
    a converter controller that responds to a load supplied by the power supply and enables at least one of a first converter, second converter and third converter based upon an amount of load supplied by the power supply, wherein only said first converter out of said first converter, said second converter and said third converter is operating when said amount of load is less than a particular load percentage of a maximum load supplied by the power supply; said first converter, said second converter and said third converter have a switching frequency of a percentage of a maximum switching frequency which corresponds to a load percentage of the maximum load supplied by the power supply.

11. The power supply as claimed in claim 10, further comprising a power factor corrector.

12. The power supply as claimed in claim 11, wherein said power factor corrector includes a boost converter.

13. The power supply as claimed in claim 12, wherein
    said boost converter has a switching frequency of a percentage of a maximum switching frequency which corresponds to a load percentage of the maximum load supplied by the power supply.

14. The power supply as claimed in claim 10, wherein said first converter is configured for 0 to 33% of the maximum load.

15. The power supply as claimed in claim 10, wherein said second converter is configured for 0 to 33% of the maximum load.

16. The power supply as claimed in claim 10, wherein said third converter is configured for 0 to 33% of the maximum load.

17. The power supply as claimed in claim 14, wherein said first converter is configured for maximum efficiency at 17% of the maximum load.

18. The power supply as claimed in claim 15, wherein said second converter is configured for maximum efficiency at 17% of the maximum load.

19. The power supply as claimed in claim 16, wherein said second converter is configured for maximum efficiency at 17% of the maximum load.

\* \* \* \* \*